(12) United States Patent
Sandberg

(10) Patent No.: US 6,922,452 B2
(45) Date of Patent: Jul. 26, 2005

(54) METHOD AND APPARATUS FOR ESTIMATING DOPPLER SPREAD

(75) Inventor: David Sandberg, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 816 days.

(21) Appl. No.: 09/812,956

(22) Filed: Mar. 27, 2001

(65) Prior Publication Data

US 2002/0172307 A1 Nov. 21, 2002

(51) Int. Cl.$^7$ .............................. H03D 1/04; H03D 1/06; H03K 5/01; H03K 6/04; H04B 1/10
(52) U.S. Cl. ...................... 375/346; 375/343; 375/371
(58) Field of Search ............................. 375/148, 346, 375/371, 150, 224, 343, 344, 360

(56) References Cited

U.S. PATENT DOCUMENTS

| | | | |
|---|---|---|---|
| 6,058,261 A | 5/2000 | Rapeli | |
| 6,563,861 B1 * | 5/2003 | Krasny et al. | 375/150 |
| 6,680,967 B1 * | 1/2004 | Westman | 375/148 |
| 6,680,969 B1 * | 1/2004 | Molnar et al. | 375/224 |

FOREIGN PATENT DOCUMENTS

| | | |
|---|---|---|
| JP | 11234190 | 8/1999 |
| WO | 00/57568 A | 9/2000 |
| WO | 01/13537 A | 2/2001 |

OTHER PUBLICATIONS

*IEEE Communications Letter*, IEEE Service Center, Piscataway, US, vol. 2, No. 12, Jan. 1999, pp. 327–330, XP000793122, M. Morelli et al., "Further Results in Carrier Frequency Estimation for Transmissions Over Flat Fading Channels".

*2000 IEEE Wireless Communications and Networking Conference*, Conference Record (Cat. No. 00$^{TH}$8540), Proceedings of IEEE Conference on Wireless Communications and Networking, Chicago, Illinois, US, pp. 1075–1079, vol. 3, XP002184721, Sep. 23–28, 2000, Piscataway, NJ, USA, IEEE, USA, ISBN: 0–7803–6596–8, H. Arslan et al., "Doppler Spread Estimation for Wireless Mobile Radio Systems".

*Communication Theory Mini–Conference*, 1999, Vancouver, British Columbia, Canada, Jun. 6–10, 1999, Piscataway, NJ, USA, IEEE, US, Jun. 6, 1999, pp. 89–95, XP010351136, ISBN: 0–7803–5653–5, Sébastian Roy et al., "Modeling the narrowband base station correlated diversity channel".

International Preliminary Examination Report PCT/SE02/00587.

*IEEE 1999*, David Mottier et al., "A Doppler Estimation for UMTS–FDD Based on Channel Power Statistics", pp. 3052–3056.

\* cited by examiner

*Primary Examiner*—Stephen Chin
*Assistant Examiner*—Curtis Odom
(74) *Attorney, Agent, or Firm*—Nixon & Vanderhye P.C.

(57) ABSTRACT

Doppler spread associated with a Rayleigh or fast fading channel established between a radio base station and a mobile radio station is estimated. In particular, the Doppler spread is estimated through calculation of the autocorrelation function of a sequence of complex channel estimates determined from a known sequence in the received signal. More specifically, a sequence of complex channel estimates obtained from the known sequence in a first sampling interval is complex conjugated and then correlated with a sequence of complex channel estimates obtained from the known reference in a second sampling interval which have been not been complex conjugated. A zero crossing of the complex autocorrelation function is detected, and the estimated Doppler spread is calculated using this zero crossing and a Bessel function.

29 Claims, 7 Drawing Sheets

\* denotes complex conjagation $C(1) = P_0 \cdot P_1 + P_1 \cdot P_2 + P_2 \cdot P_3 + ...$
$C(2) = P_0 \cdot P_2 + P_1 \cdot P_3 + P_2 \cdot P_4 + ...$
$C_{m,\ell} = C(1) + C(2) + ... + C(29)$

METHOD AND APPARATUS FOR ESTIMATING DOPPLER SPREAD

FIELD OF THE INVENTION

The present invention relates to mobile radio communications, and more particularly, to estimating Doppler spread in a mobile radio communications system.

BACKGROUND AND SUMMARY OF THE INVENTION

In mobile radio communications systems, the signal propagation between a transmitter and a receiver can be understood by introducing the concept of a mobile radio channel impulse response that introduces a filtering action on the signal. For example, the baseband impulse response, h(t), can be expressed as:

$$h(t) = \sum_{i}^{N} \chi_i e^{j\phi_i} \delta(t - \tau_i) \quad (1)$$

where $\chi_i$ is the amplitude of the $i^{th}$ received signal, $\phi_i$ is the phase shift of the $i^{th}$ received signal, $\delta$ is the impulse function, and $\tau_i$ is the time delay of the $i^{th}$ received signal. Equation (1) shows that the received signal can be thought of as a series of time-delayed, phase-shifted, and attenuated versions of the transmitted signal. If the channel is time variant, then $\chi_i$, $\phi_i$, and $\tau_i$ are also functions of time.

Radio propagation is characterized by multiple reflections, diffractions, and attenuations of the signal caused by natural obstacles like buildings, hills, etc. which result in multi-path propagation. Accordingly, radio waves arrive at a mobile receiver from different directions and with different time delays, and are made up of a possible direct ray and reflected rays. Scattered reflections cause Rayleigh fading and have very small mutual delay differences that are not resolvable in the receiver. These rays (which have a magnitude and a phase) combine vectorially at the receiver to give the resultant signal, which depends on the phases and amplitudes of the reflections that exist in the multi-path field.

As a mobile radio moves from one location to another, a Doppler effect occurs. In general, the Doppler effect relates to a change in the apparent frequency of a source of electromagnetic radiation when there is a relative motion between the source and the observer. For moving mobile radios, where multi-path propagation is common, the phase relationship between the components of the various incoming rays changes, so the resultant signal is spectrally spread. This phenomenon is referred to hereafter as Doppler spreading. Whenever relative motion exists in the absence of multipath propagation, there is a Doppler shift of the frequency components of the received signal, but no spreading of the received signal spectrum. This phenomenon is referred to as Doppler shifting. This present invention is directed to estimating Doppler spread.

A multi-path signal envelope is characterized by a distribution function of amplitude that follows the so-called Rayleigh distribution function, which is why multipath is sometimes referred to as Rayleigh fading. When a mobile radio moves in a multipath environment, the received signal appears to vanish, i.e., "fade," at certain positions. However, moving a few meters brings it back again. Thus, a mobile radio moving in a multipath environment experiences signal fluctuations, and this effect is referred to as Rayleigh or fast fading.

FIG. 1 illustrates a schematic diagram of a communications system 10 with a transmitter 12, transmitting information over a carrier frequency $f_c$ on a radio channel that is subject to fading a(t) and noise n(t). The received signal is received on a frequency that is offset from the transmit carrier frequency. The time-varying, complex fading coefficient a(t) models fast fading. In essence, the Doppler spread describes how fast the channel is changing, or equivalently the spreading of the received signal caused by Rayleigh fading. More formally, $$f_d = f_c \cdot v/c \quad (2)$$

where $f_d$ is the Doppler spread, $f_c$ is the carrier frequency, v is the mobile velocity, and c is the speed of light.

Third generation wireless cellular communications systems, such as the Universal Mobile Communications Systems (UMTS), must support communications with a mobile station traveling at a considerable velocity, e.g., up to 500 km/h, over Rayleigh fading radio channels. The resulting Doppler spreading on such a channel leads to performance degradations absent suitable compensation. To be able to track the channel accurately, knowledge of the Doppler spread is needed. One variable that affects the accuracy of such an estimation is a frequency offset caused by differences between local oscillators in the transmitter and receiver.

FIG. 2 illustrates Doppler spreading and frequency offset errors. More particularly, FIG. 2(a) shows a transmitted signal corresponding to a narrow frequency spectrum. FIG. 2(b) shows that transmitted signal spectrum much wider after Doppler spreading by a fast fading channel. In addition to the Doppler spreading in the frequency domain, where $f_d$ shows the maximum Doppler spread of the spectrum, there is a frequency error or offset that shifts the whole frequency spectrum. FIG. 3 illustrates phase changes of the received signal caused by Doppler spreading over a fast fading channel with a frequency offset. The slope (dashed line) of the phase is greater than zero represents a positive frequency offset. The unpredictable variations in the phase are caused by Rayleigh fading. When a Rayleigh fading signal is received, it can be viewed as a sum of a number of incoming waves, each with its own amplitude, frequency, and phase. The vector sum of these waves looks in the frequency domain like FIG. 2(b), and in the time domain like FIG. 3. In order to accurately determine the Doppler spreading of a fast fading channel, any frequency offset should be compensated before estimating the Doppler spreading.

Accurate Doppler spread estimation can be quite useful in mobile communications systems. First, knowledge of the Doppler spread can be used to improve the performance of the demodulator and reduce bit error rates. Second, accurate Doppler spread estimations may be used to optimize interleaving links in order to reduce reception delays. Third, in a cellular system with hierarchical cell layers, the Doppler spread may also be used by the network in cell layer assignment strategies. For example, low speed mobile radios would be assigned to pico cells, medium speed mobile stations to micro cells, and high speed mobile stations to macro cells. By assigning high speed mobiles to large cells, the number of handovers can be reduced. This reduces the amount of signaling, and therefore improves system capacity.

A fourth example use for accurate Doppler estimation is to adjust the filtering bandwidth for channel estimation in the receiver, which is one way to improve demodulator performance. When a narrowband signal is transmitted over a Rayleigh fading channel, its spectrum spreads. After this spectral spreading, it looks like FIG. 3 in the time domain. In order to coherently detect the data symbols, a coherent receiver has to track these unpredictable changes in the phase. This tracking (often called channel estimation) is usually performed using some kind of filtering, with the goal to filter out as much noise as possible. With knowledge of the Doppler spread, the filtering can be adjusted to pass the useful signal and filter out the noise outside the Doppler spectrum.

A fifth example use would be to set an appropriate power control step in a wideband CDMA-type mobile communications system. For a Rayleigh fading channel with a large Doppler spread, the channel power changes rapidly. Power control tries to compensate for these channel changes. Therefore, for a rapidly changing channel (i.e., high Doppler spread), it can be advantageous to use a larger power control step size than for a slowly fading channel.

These and other benefits are achieved by estimating a Doppler spread associated with a Rayleigh or fast fading channel established between a transmitter and receiver, e.g., a base station and a mobile station. In particular, the Doppler spread is estimated through calculation of the autocorrelation function of a sequence of complex channel estimates determined from the known sequence in a received signal. More specifically, a sequence of complex channel estimates obtained from the known sequence in a first sampling interval is complex conjugated and then correlated with a sequence of complex channel estimates obtained from the known sequence in a second sampling interval which have been not been complex conjugated. A zero crossing of the complex autocorrelation function is detected, and the estimated Doppler spread is calculated using this zero crossing and a Bessel function.

In a preferred, non-limiting embodiment, the known sequence is compensated for a frequency offset. The estimated Doppler spread and the compensated known sequence may be used to estimate the Rayleigh or fast fading channel. The estimated channel response is used to filter an unknown sequence in the received signal to compensate for phase error caused by the Doppler spreading over the fast fading channel.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not to scale, emphasis instead being placed upon illustrating the principles of the invention.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using a Digital Signal Processor (DSP).

Figure 1:
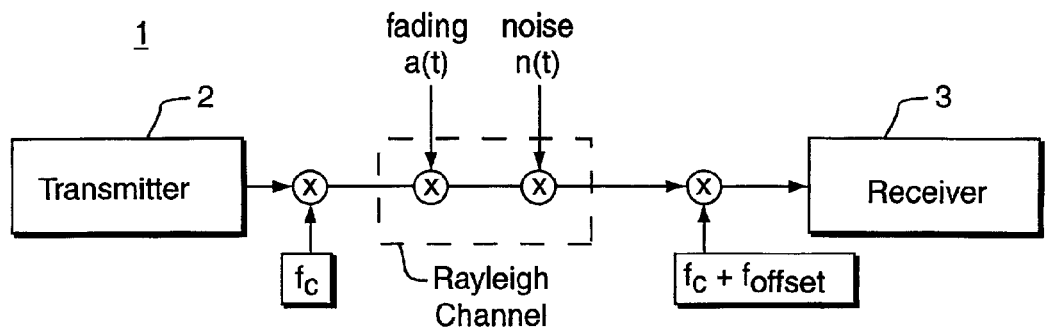
FIG. 1 is a function block diagram illustrating a communications system where information is transmitted between a transmitter and a receiver over a Rayleigh channel.
Figure 2A:
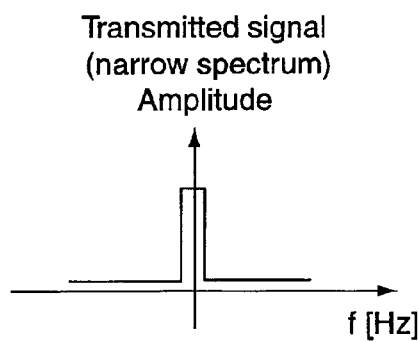
FIGS. 2(a) and 2(b) illustrate a transmitted signal at the output of the transmitter in FIG. 1, and the received signal after spreading by the Rayleigh channel, respectively.
Figure 2B:
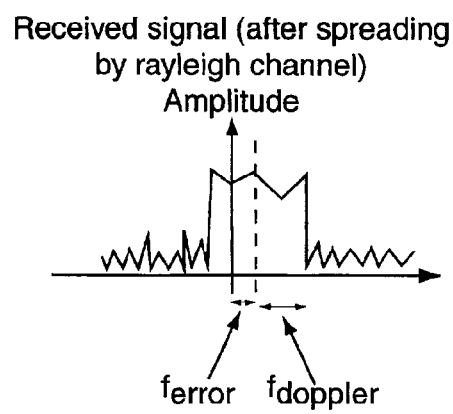
Figure 3:
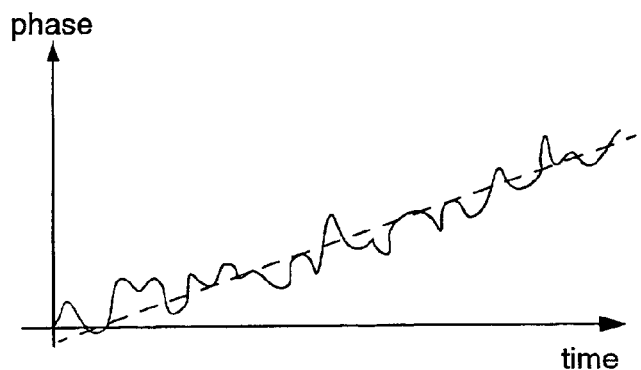
FIG. 3 illustrates in the complex plane an example of the received signal influenced by frequency offset and Rayleigh channel spreading.
Figure 4:
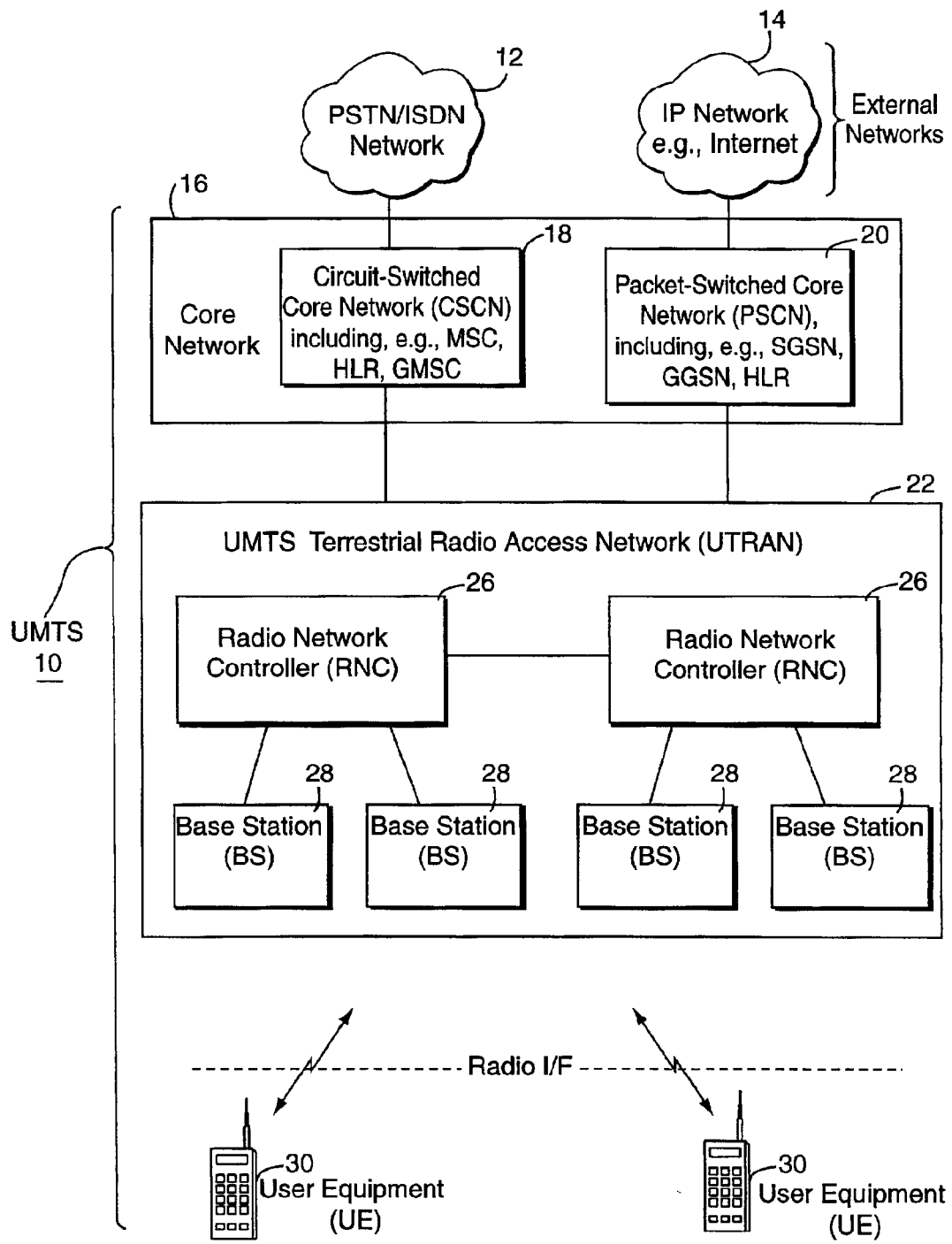
FIG. 4 is a block diagram of a mobile radio communications system which is one example context in which the present invention may be advantageously employed.

The present invention may be employed in any mobile radio communications system such as that shown in FIG. 1. However, a more specific, but non-limiting example of a mobile communications system is the Universal Mobile Telecommunications System (UMTS) 10 shown in FIG. 4. An example Universal Mobile Telecommunications System (UMTS) 10 is shown in FIG. 1. A representative, core network 16, includes a circuit-switched core network (CS CN), shown as box 18, and a packet-switched core network (PS CN), shown as box 20. The circuit-switched core network includes nodes, e.g., Mobile Switching Centers (MSC) 18, Home Locations Register (HLR), Gateway MISC (GMSC), etc., that provide circuit-switched services. The packet-switched core network includes nodes, e.g., Serving GPRS Support Nodes (SGSN) 20, Gateway GPRS Support Node (GGSN), HLR, etc., that are tailored to provide packet-switched services. The CSCN 18 is coupled to an external circuit-switched network 12, such as the Public Switched Telephone Network (PSTN) or the Integrated Services Digital Network (ISDN). The packet-switched core network 20 is coupled to an external packet-switched network 14, such as the Internet.

Each of the core networks 18 and 20 is coupled to a UMTS Terrestrial Radio Access Network (UTRAN) 22 that includes one or more Radio Network Controllers (RNCs) 26. Each RNC is coupled to a plurality of base stations (BSs) 28 and to other RNCs in the UTRAN 22. Each base station 28 corresponds to one access point (one sector or cell) or includes plural access points. Radio communications between one or more base station access points and wireless user equipment unit (UE) 30 are by way of a radio interface. Radio access in this non-limiting example is based on Wideband-CDMA (W-CDMA) with individual radio channels distinguished using spreading codes. Wideband-CDMA provides wide radio bandwidth for multi-media services including packet data applications that have high data rate/bandwidth requirements. While Doppler spread estimation may be employed in any radio receiver, including the UE 30, it is particularly advantageously employed in radio base stations 28.

The Doppler spread estimation technique in accordance with the present invention may be used for both uplink (mobile-to-base station) and downlink (base station-to-mobile) communications. The example slot structure described herein is similar to a slot structure used in the uplink in W-CDMA. In the downlink, a common channel, such as the Common Pilot Channel, may be used for channel and Doppler estimation.

Figure 5:
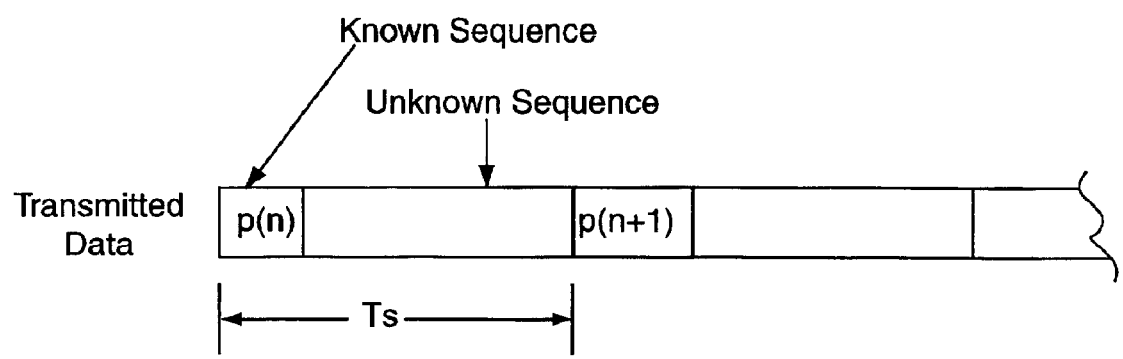
FIG. 5 illustrates a format of transmitted data which includes both known and unknown sequences per timeslot.

Referring to FIG. 5, radio transmitters, such as user equipment units 30, typically transmit information over a Rayleigh or fast fading channel to base stations 28 in timeslots indicated as $T_s$. From the known sequence in each time slot, a complex sequence $p_n$ of channel samples is generated, where n is the time slot index. The unknown sequence which pertains to the actual content to be communicated to the user equipment unit 30 is sent to a demodulator for detection. The present invention employs the known sequence in each timeslot to estimate the Doppler spread associated with the Rayleigh or fast fading channel between the user equipment 30 and the base station 28. Since every user equipment unit moves at a user determined velocity, each channel has its own Doppler spread. As explained above, Doppler spread is defined as a spreading of the transmitted signal spectrum in the presence of multipath propagation and movement of the user equipment unit. Doppler spread is a measure of the rate of the random phase variations introduced by the Rayleigh channel.

While Doppler spread can be estimated in different ways, the present invention estimates Doppler spread by calculating a complex autocorrelation function for a sequence of complex channel estimates. These complex channel estimates are phasors or vectors in the complex plane with a magnitude and a phase angle (as opposed to a scalar which has only a magnitude and no phase angle). The Doppler spread estimation is based upon the principle that the autocorrelation function of a Rayleigh or fast fading channel $C_l$ may be expressed as a zero order Bessel function of the first kind, $J_0$, as set forth below in equation (3):

$$C_l = J_0(2\pi \cdot f_d \cdot l \cdot T_s) \quad (3)$$

where l is the "lag" in the autocorrelation function $C_l$. The lag in an autocorrelation is the time shift or difference between correlated signals. More specifically, the lag is the mutual time difference when two versions of a sequence are correlated. For example, the autocorrelation for lag=0 for the sequence x would be $$C(0) = x(0)^* x(0) + x(1)^* x(1) + x(2)^* x(2) + \ldots$$

and for lag=1

$$C(1) = x(0)^* x(1) + x(1)^* x(2) + x(2)^* x(3) + \ldots$$

(in this example x is a real signal).

At a particular lag value, $i_z$, where the autocorrelation $C_l$ is zero, equation (3) may be set to zero and rewritten to solve for the Doppler spread as follows:

$$\hat{f}_d = \frac{J_z}{2\pi \cdot i_z \cdot T_s} \quad (4)$$

where $\hat{f}_d$ is the estimated Doppler spread in Hertz, $J_z$ is the lowest positive value that satisfies equation (5) below, $T_s$ is the sample time interval corresponding to one sample per timeslot, and $$J_0(J_z) = 0 \quad (5)$$

where $J_0$ is the zero-order Bessel function of the first kind.

Using these relationships, the present invention determines the autocorrelation function of a received signal using the known sequences, detects the first zero crossing of that autocorrelation function, and solves for the Doppler spread using the determined zero crossing lag $i_z$ and equations (4) and (5) above.

The autocorrelation for a received signal is determined based on several timeslots of known sequences (see FIG. 5). The number of timeslots used for estimation is a design parameter that depends on the desired accuracy of the estimate. The more samples used, the more accurate the estimation, but at a cost of increased computational complexity. A typical value for this is 60, but it depends on input signal to noise ratio. The input to the Doppler spread estimator in accordance with the present invention is a sequence of complex channel estimates ($p_n$) acquired from the known sequences transmitted. The autocorrelation function of this known sequence is determined in accordance with:

$$\hat{C}_l = \sum_{k=0}^{N-1} (p_k) \cdot (p_{k+l})^* \quad (6)$$

where l is the lag in the autocorrelation function, and N is the number of channel coefficients used for estimation. An asterisk (*) denotes the complex conjugate. The autocorrelation in the present invention uses complex values so that phase changes as well as magnitude changes are taken into account when determining an estimate of Doppler spreading.

Figure 6:
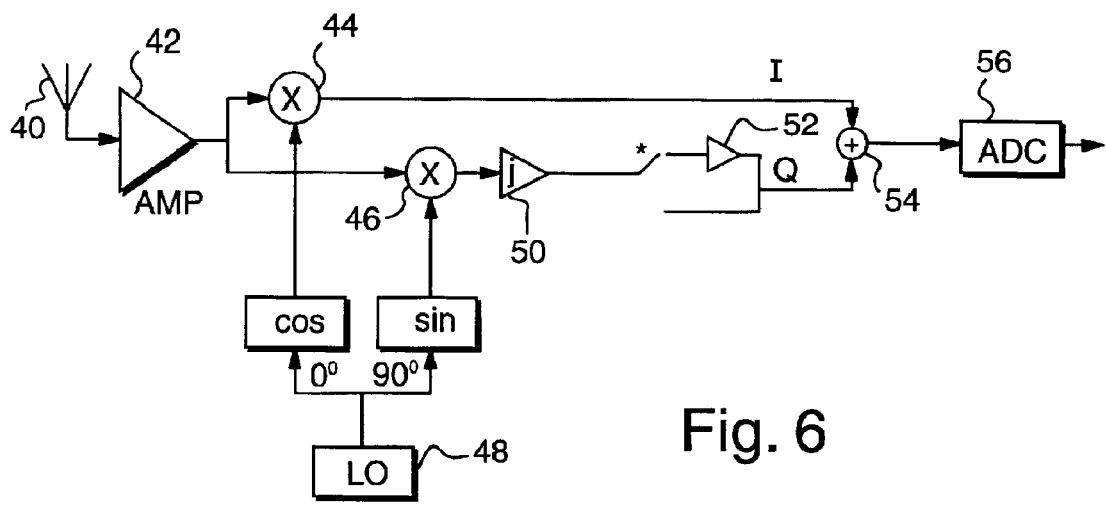
FIG. 6 illustrates a portion of a receiver to illustrate using analog components how a received complex signal may be complex conjugated.

FIG. 6 illustrates a simplified portion of a radio receiver showing one example of how complex conjugates of complex sequences may be obtained using analog components. The received radio signal (which is real) is obtained by way of antenna 40 and amplifier 42 before being provided to two mixers 44 and 46. The other input to mixer 44 is the cosine of the carrier frequency $f_c$ generated by the local oscillator 48. The other input to mixer 46 is the sine (90° out of phase with the cosine) of the carrier frequency $f_c$ generated by the local oscillator 48. The output of mixer 44 is the real, in-phase portion (I) of the sequence, and the output of the mixer 46 is the imaginary or quadrature portion (Q) of the complex sequence. The imaginary portion is multiplied by the imaginary unit "j" represented here as amplifier 50. The in-phase and quadrature components are added in a summer 54 to obtain the complex number I+jQ. Complex conjugation is more commonly and more preferably performed in the digital domain after analog-to-digital conversion, because it is a simple operation and does not require the expensive hardware depicted in FIG. 6. The analog implementation shown in FIG. 6 is only for purposes of illustration.

To obtain the complex conjugate of a complex number, the sign of the imaginary number is changed, i.e., I−jQ. This change in sign is represented by the inverter 52. Thus, when a complex conjugate is desired, the inverter path is selected; otherwise, the quadrature sequence is passed without inversion to summer 54. The complex number output from summer 54 is then passed to a sampler or analog-to-digital converter 56 which samples the complex sequence once every sampling interval $T_s$. Since some of the symbols in the sequence are known to the receiver, those known symbols can be multiplied with the samples of the received signal corresponding to the known signal in order to estimate the effect of the channel.

Figure 7:
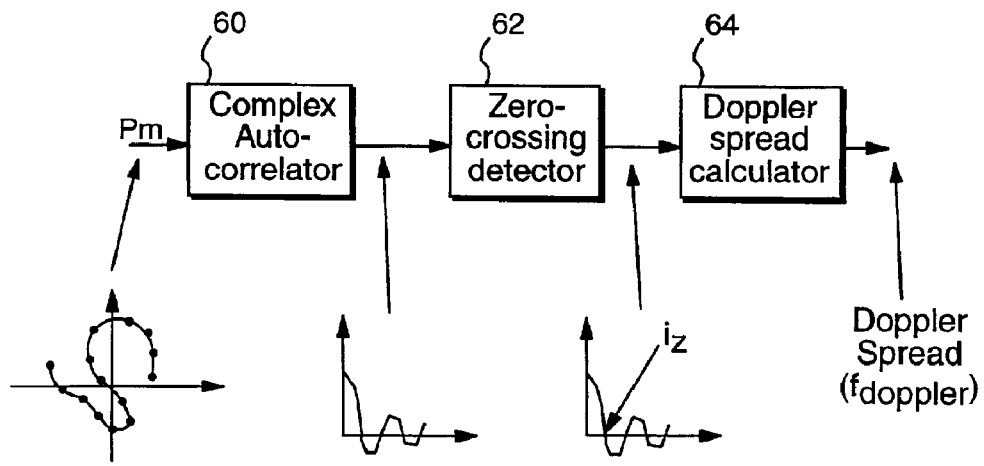
FIG. 7 illustrates an example Doppler spreading estimator.
Figure 8:
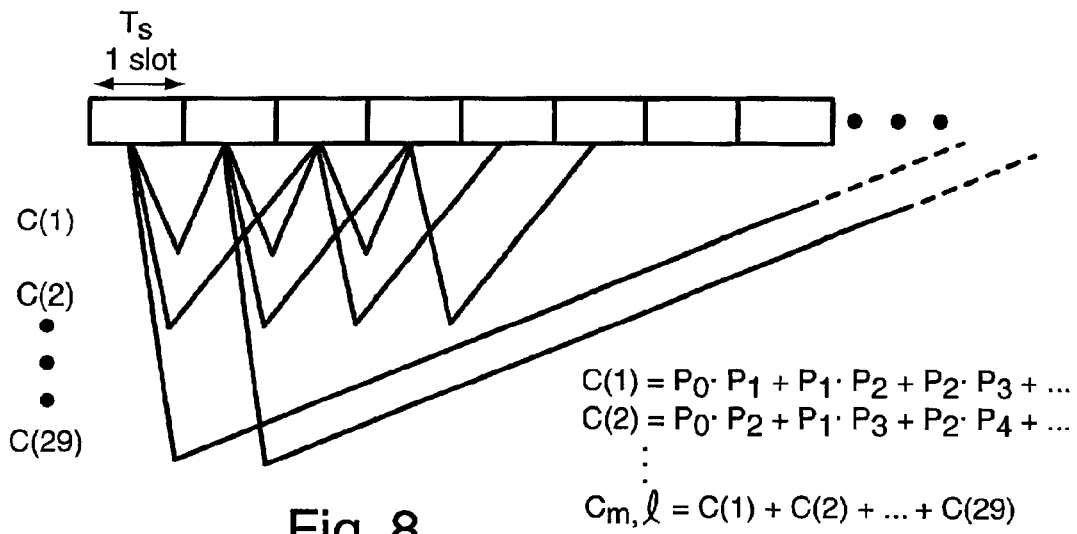
FIG. 8 illustrates one example of autocorrelation in accordance with the present invention.

FIG. 7 shows one example of a Doppler spread estimator in accordance with the present invention. The input to the complex autocorrelator 60 is complex channel samples generated by a sampler/A-to-D converter 56 shown in FIG. 7. Each of the black dots shown as an input corresponds to a sequence of known symbols representing one complex channel estimate. The complex autocorrelator 60 calculates the autocorrelation function in equation (6). FIG. 8 illustrates a way of performing the complex correlation of equation (6). The complex autocorrelator 60 uses one channel estimate from every timeslot $T_s$, and in this example, performs a complex correlation with the known signal for a number of different lags. For example, the complex correlation for lag 1 is $$C_1 = p_0 \cdot p_1^* + p_1 \cdot p_2^* + p_2 \cdot p_3^* + \ldots$$

The complex correlation for lag 2 is $$C_2 = p_0 \cdot p_2^* + p_1 \cdot p_3^* + p_2 \cdot p_4^* + \ldots$$

Figure 9:
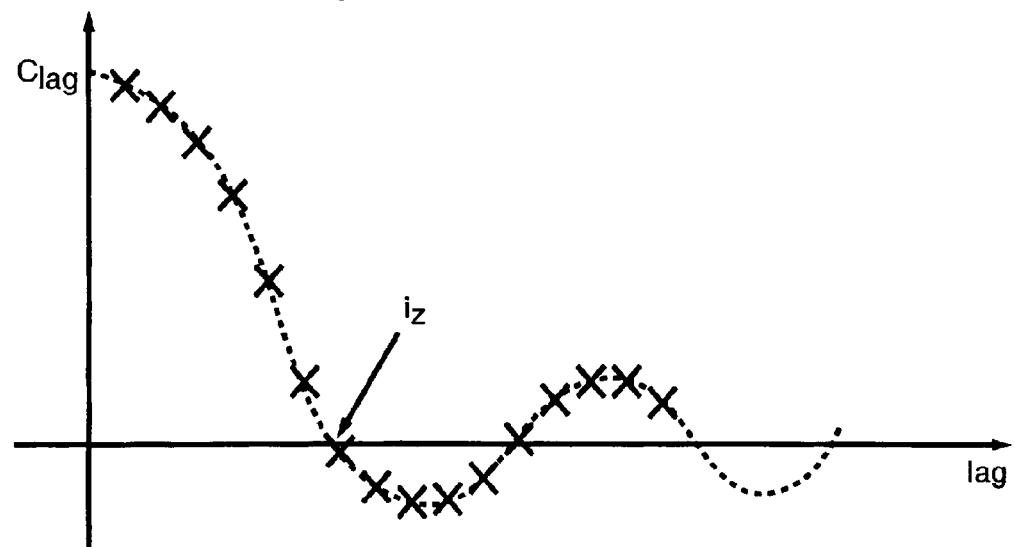
FIG. 9 illustrates an autocorrelation function in accordance with the present invention as a function of lag identifying a first zero crossing of that autocorrelation function.

The output of the complex autocorrelator 60 is the autocorrelation function $C_l$ illustrated in FIG. 9.

Figure 10:
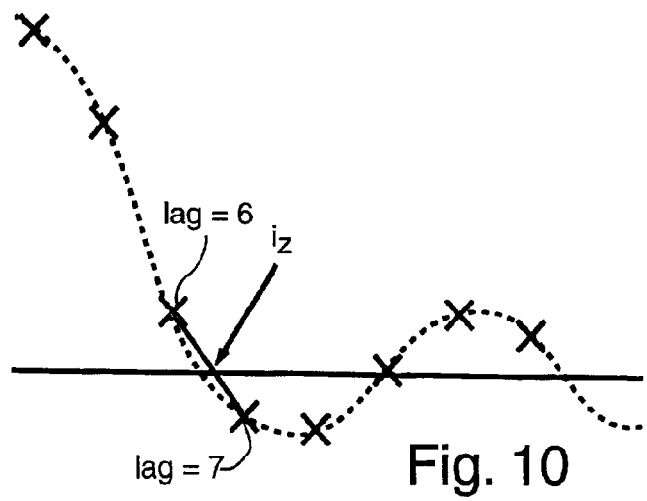
FIG. 10 illustrates an interpolation technique for determining that zero crossing.

The zero crossing detector 62 determines the first zero crossing $i_z$ of the autocorrelation function. At this stage, the estimated autocorrelation function should be compared with the theoretical one, i.e., the Bessel function. This can be done by finding the location of the first zero on the positive axis and comparing it to the first zero in the estimated autocorrelation function. Locations of the first minimum in the autocorrelation function could also be compared. The search for the first zero crossing is performed by identifying the first lag value for which the autocorrelation function is negative. FIG. 9 illustrates particular lag values for the autocorrelation function and indicates the first zero crossing at lag $i_z$. That zero crossing does not correspond to an integer lag value, and therefore, the exact lag value corresponding to the zero crossing may be determined by linear interpolation as shown in FIG. 10. For example, FIG. 10 shows lag 6 and lag 7 as the integral lag values adjacent to the zero crossing of the autocorrelation function. Therefore, the zero crossing lag value $i_z$ can be linearly interpolated to be 6.5.

Returning to FIG. 7, the zero crossing lag value $i_z$ is then provided to the Doppler spread calculator 64 which solves equation (4) above using the $i_z$ value, the known timeslot/sampling duration $T_s$, and equation (5).

Figure 11:
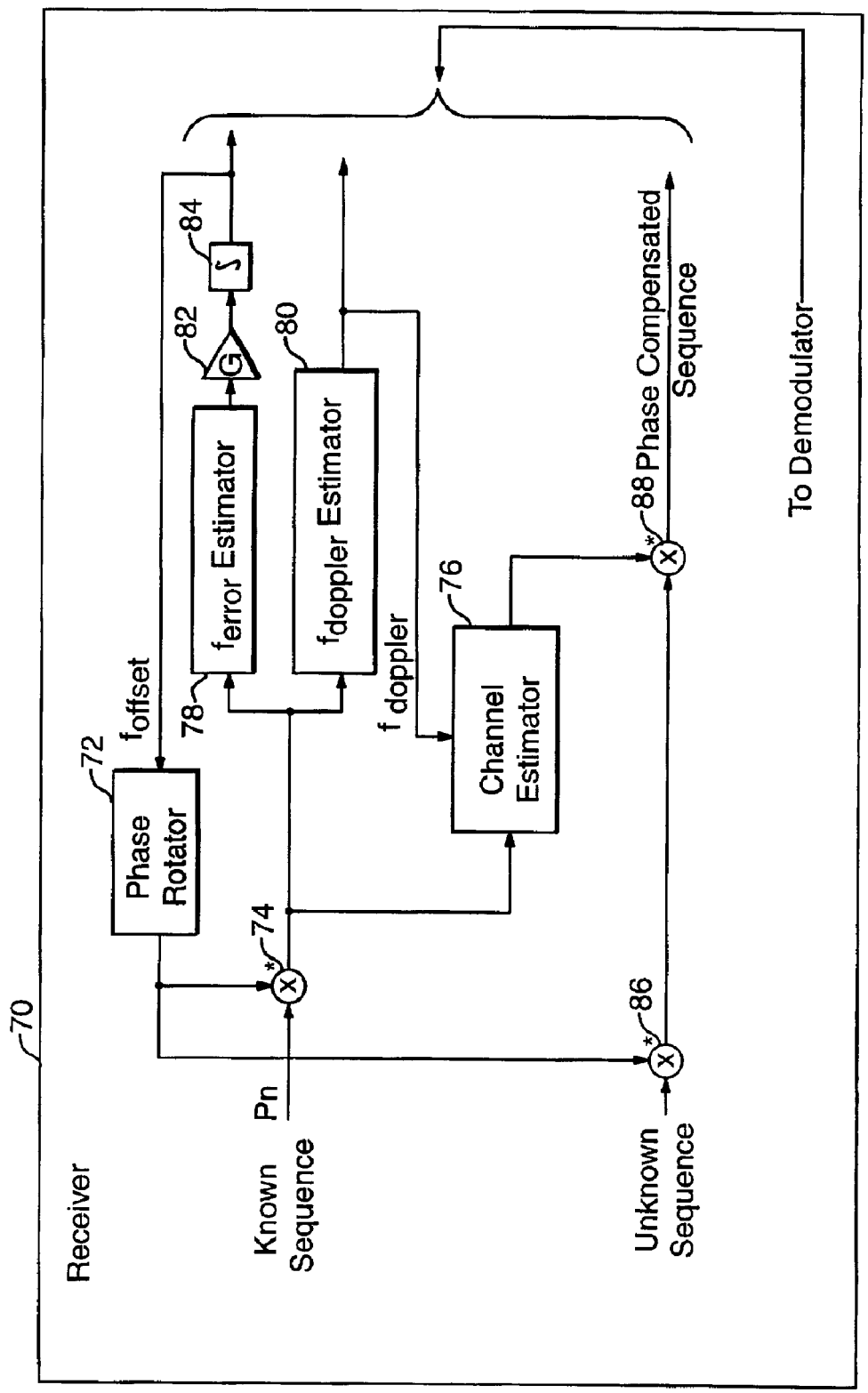
FIG. 11 illustrates a block diagram of an example receiver in which the present invention is employed.

FIG. 11 illustrates an example radio receiver 70 in which a Doppler spreading estimator 80 in accordance with the present invention may be advantageously employed. A received signal is parsed so that the known sequence $P_n$ is input into a mixer 74, and the unknown sequence is input to a mixer 86. Before inputting the known sequence $p_n$ to the Doppler spreading estimator 80, it is desirable to compensate the known sequence for a frequency offset between the local oscillators and the transmitter and the receiver. A frequency offset on the signal at the input to the Doppler spreading estimator 80 means that its autocorrelation is no longer a Bessel function, thereby impairing the accurate determination of the Doppler spread. The frequency error estimator 78 determines the frequency offset which is amplified at 82 and integrated at 84. The frequency offset is employed by a phase rotator 72 which generates a rotating phasor by calculating $e^{j2\pi ft}$, where f is the frequency of rotation and t is the time. The compensation phasor is complex conjugated before being multiplied in mixer 74 with the known sequence $p_n$. The frequency compensation (performed by mixers 74 and 86) multiplies the phasors from the phase rotator 72 with the input sequence. To compensate the input signal rotating with the same frequency $f_1$, the frequency $f_1$ is estimated as frequency $f_2$. Because the rotation of the input signal may be expressed by $e^{j2\pi f_1 t}$ and the rotation of the compensation signal as $e^{j2\pi f_2 t}$, the output from the multiplier will be $e^{j2\pi f_1 t} \cdot (e^{j2\pi f_2 t})^* = e^{j2\pi (f_1 - f_2) t}$. If $f_2$ is close to $f_1$, the frequency on the input sequence is compensated.

In any event, the known sequence (preferably frequency offset compensated) is provided to the Doppler spread estimator 80 which performs the Doppler spreading estimation as described above. The Doppler spread estimate is provided to the channel estimator 76 along with the known sequence used to estimate the channel. The channel estimator 76 may be, for example, a finite impulse response (FIR) transversal filter used to estimate the channel impulse response (see equation (1)) based on the known sequence. That channel estimator takes into account the Doppler spread when formulating the channel estimate. Accordingly, when the unknown sequence is received, and preferably frequency offset compensated at mixer 86, it is combined with the channel estimate at mixer 88 to generate a phase-compensated sequence. In effect, the unknown sequence is filtered by the updated channel estimate. The phase compensated sequence is then forwarded to a demodulator to extract the transmitted data content. Depending on system performance requirements, the estimated variables may be used for different purposes in the demodulator. For example, a multi-path searcher in a W-CDMA system, used to find new multipaths, may use the estimations of Doppler spread and frequency offset to make path searching more efficient.

Figure 12:
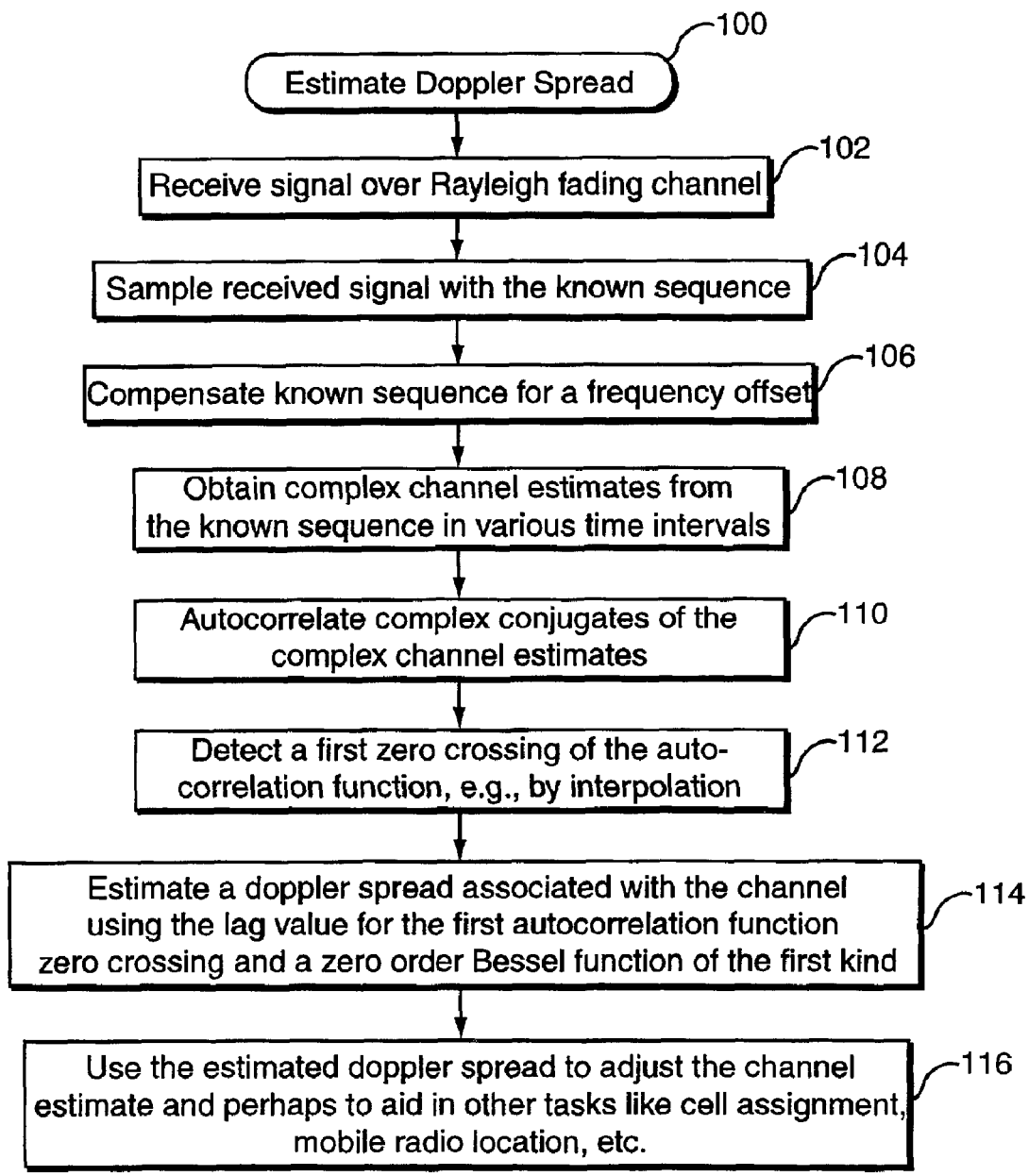
FIG. 12 illustrates example procedures for estimating Doppler spread.

FIG. 12 illustrates a Doppler spread procedure (block 100) in accordance with one example embodiment of the present invention. A transmitted signal having timeslots including known and unknown sequences is received over a Rayleigh fading channel (block 102). The received signal of the known sequence is sampled (block 104), and preferably compensated for any frequency offset (block 106). Complex channel estimates are obtained from the known sequence in various time intervals/slots (block 108). An autocorrelation function is calculated using complex channel estimates and their complex conjugates, see equation (6) (block 110). From the determined autocorrelation function, a first zero crossing is detected, e.g., by interpolation (block 112). A Doppler spread associated with the Rayleigh fading channel is estimated using the lag value for the first autocorrelation function zero crossing and the zero order Bessel function of the first kind (block 114). The estimated Doppler spread is used to adjust the channel estimate, and perhaps to aid in other tasks like cell assignment, mobile radio location, etc. as discussed above (block 116).

Thus, the present invention accurately estimates Doppler spread, which may be used in a number of advantageous ways, some of which are described above. Because complex channel estimates are used, the Doppler spread estimation is not sensitive to variations in transmit power present, for example, in a power controlled W-CDMA system. Since the Doppler spread estimator is placed inside a frequency offset tracking loop, it is not sensitive to frequency offsets often present in communication systems.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. While the present invention is described in relation to a preferred example embodiment, it is to be understood that this disclosure is only illustrative and exemplary of the present invention. Accordingly, it is intended that the invention be limited only by the scope of the claims appended hereto.

What is claimed is:

1. A method, comprising:
    detecting a signal received over a Rayleigh fading channel;
    estimating a Doppler spread associated with the Rayleigh fading channel based on an autocorrelation function of a sequence of complex channel estimates; and
    using the estimated Doppler spread to estimate the Rayleigh channel,
    wherein the channel estimate is combined with the received signal to compensate for a phase change caused by Rayleigh fading.

2. The method in claim 1, wherein the received signal includes a known sequence, the method further comprising:
    obtaining the complex channel estimates from the known sequence in a first sampling interval and the known sequence in a second sampling interval.

3. The method in claim 2, further comprising:
    complex-conjugating a sequence of complex channel estimates obtained from the known sequence in a first sampling interval, and
    correlating the complex-conjugated sequence with a sequence of complex channel estimates obtained from a second sampling interval.

4. The method in claim 2, further comprising:
    compensating the known sequence for a frequency offset.

5. The method in claim 4, wherein the frequency offset is determined using a correlation of the known sequence in the received signal.

6. The method in claim 4, further comprising:
    using the estimated Doppler spread and the compensated known sequence to estimate the Rayleigh channel.

7. A method, comprising:
    detecting a signal received over a Rayleigh fading channel;
    estimating a Doppler spread associated with the Rayleigh fading channel based on an autocorrelation function of a sequence of complex channel estimates;
    detecting a zero crossing of the complex correlation; and
    calculating the Doppler spread using the zero crossing and a Bessel function.

8. The method in claim 7, wherein the zero crossing is detected using interpolation.

9. A method, comprising:
    sampling a signal with a known sequence $p_n$ received over a Rayleigh fading channel;
    calculating a Doppler spread associated with the Rayleigh fading channel by autocorrelating a sequence of complex channel estimates obtained from the known sequence in a first sampling interval and the known sequence in a second sampling interval; and
    calculating the autocorrelation using the following:

$$\hat{C} = \sum_{k=0}^{N} (p_k)^* \cdot (p_{k+l})$$

where $\hat{C}_l$ is an autocorrelation function, $P_k$ and $P_{k+l}$ are sequences of complex channel estimates, k is an index, * represents complex conjugate, l is a lag in the autocorrelation function, and N is a number of channel coefficients used for estimating the Rayleigh fading channel.

10. The method in claim 9, further comprising:
    determining a zero crossing for the autocorrelation function $\hat{C}_l$.

11. The method in claim 10, wherein the zero crossing is a first zero crossing determined for the autocorrelation function $\hat{C}_l$ and is determined by interpolation.

12. The method in claim 10, further comprising:
    using the zero crossing, calculating the Doppler spread $\hat{f}_d$ using the following:

$$\hat{f}_d = \frac{J_z}{2\pi \cdot i_z \cdot T_s}$$

where $T_s$ is the sample time, $i_z$ is the zero crossing for the autocorrelation function $\hat{C}_l$, and $J_z$ is a lowest positive value that satisfies the following:

$$J_0(J_z) = 0$$

where $J_0$ is the zero-order Bessel function.

13. The method in claim 12, further comprising:
    compensating the known sequence for a frequency offset.

14. The method in claim 13, wherein the frequency offset is determined using a correlation of the known sequence in the received signal.

15. The method in claim 13, further comprising:
    using the estimated Doppler spread and the compensated known sequence to estimate the Rayleigh channel,
    wherein the channel estimate is combined with an unknown sequence in the received signal to compensate for phase changes caused by Rayleigh fading.

16. The method in claim 12, further comprising:
    using the estimated Doppler spread to estimate the Rayleigh channel,
    combining an unknown sequence in the received signal with the channel estimate to compensate for phase changes caused by Rayleigh fading.

17. Apparatus for use in a receiver, comprising:
    a detector configured to detect a signal with a known sequence received over a Rayleigh fading channel associated with a communication with a transmitter, and
    a Doppler spread estimator configured to estimate a Doppler spread associated with the Rayleigh fading channel including an autocorrelator configured to calculate an autocorrelation function of a sequence of complex channel estimates determined using the known sequence;
    a channel estimator configured to estimate the Rayleigh channel using the estimated Doppler spread; and a combiner for combining an unknown sequence in the received signal with the estimated Rayleigh channel to compensate for phase changes caused by Rayleigh fading.

18. The apparatus in claim 17, wherein the complex channel estimates are obtained from the known sequence in a first sampling interval and the known sequence in a second sampling interval.

19. Apparatus for use in a receiver, comprising:
 a detector configured to detect a signal with a known sequence received over a Rayleigh fading channel associated with a communication with a transmitter;
 a Doppler spread estimator configured to estimate a Doppler spread associated with the Rayleigh fading channel including an autocorrelator configured to calculate an autocorrelation function of a sequence of complex channel estimates determined using the known sequence;
 a frequency offset compensator configured to compensate the known sequence for a frequency offset and to determine the frequency offset using a correlation of the known sequence in the received signal;
 a channel estimator configured to estimate the Rayleigh channel using the estimated Doppler spread and the compensated known sequence; and
 a combiner for combining the channel estimate with an unknown sequence in the received signal to compensate for phase changes caused by Rayleigh fading.

20. Apparatus for use in a receiver, comprising:
 a detector configured to detect a signal with a known sequence received over a Rayleigh fading channel associated with a communication with a transmitter,
 a Doppler spread estimator configured to estimate a Doppler spread associated with the Rayleigh fading channel including an autocorrelator configured to calculate an autocorrelation function of a sequence of complex channel estimates determined using the known sequence,
 a zero crossing detector configured to detect a zero crossing of the autocorrelation, and
 wherein the Doppler spread estimator is configured to calculate the Doppler spread using the zero crossing and a Bessel function.

21. The apparatus in claim 20, wherein the zero crossing detector is configured to use interpolation to detect the zero crossing.

22. An apparatus, comprising:
 means for sampling a signal with a known sequence $p_n$ received over a Rayleigh fading channel, and
 means for calculating a Doppler spread associated with the Rayleigh fading channel using an autocorrelation function of the Rayleigh fading channel determined using the known sequence samples in the received signal, wherein the means for calculating calculates the autocorrelation function using the following:

$$\hat{C}_l = \sum_{k=0}^{N} (p_k)^* \cdot (p_{k+l})$$

where $\hat{C}_l$ is the autocorrelation function, $p_k$ and $p_{k+1}$ are sequences of complex channel estimates K is an index. * represents complex conjugate, 1 is a lag in the autocorrelaion function, and N is a number of channel coefficients used for estimating the Rayleigh fading channel.

23. The apparatus in claim 22, further comprising:
 means for determining a zero crossing for the autocorrelation function $\hat{C}_l$.

24. The apparatus in claim 23, wherein the zero crossing is a first zero crossing determined for the autocorrelation function $\hat{C}_l$ and is determined by interpolation.

25. The apparatus in claim 24, wherein the means for calculating uses the zero crossing to calculate the Doppler spread $f_d$ in accordance with the following:

$$\hat{f}_d = \frac{J_z}{2\pi \cdot i_z \cdot T_s}$$

where $T_s$ is the sample time, $i_z$ is the zero crossing of the autocorrelation function $\hat{C}_l$, and $J_z$ is a lowest positive value that satisfies the following:

$$J_0(J_z)=0$$

where $J_0$ is the zero-order Bessel function.

26. The apparatus in claim 25, further comprising:
 means for compensating the known sequence for a frequency offset.

27. The apparatus in claim 26, wherein the frequency offset is determined using a correlation of the known sequence in the received signal.

28. The apparatus in claim 27, further comprising:
 means for estimating the Rayleigh channel using the estimated Doppler spread and the compensated known sequence,
 wherein the estimated channel is used to compensate an unknown sequence in the received signal for phase changes caused by Rayleigh fading.

29. The apparatus in claim 22, further comprising:
 means for estimating the Rayleigh channel using the estimated Doppler spread,
 wherein the estimated channel is used to compensate an unknown sequence in the received signal for phase changes error caused by Rayleigh fading.

* * * * *